United States Patent [19]

Hargis

[11] Patent Number: 4,501,534
[45] Date of Patent: Feb. 26, 1985

[54] METHOD AND APPARATUS FOR PROLONGING SLEEVE BEARING LIFE IN A MULTIPLE SPEED ROTATIONAL DEVICE

[75] Inventor: Larry N. Hargis, N. Syracuse, N.Y.

[73] Assignee: Carrier Corporation, Syracuse, N.Y.

[21] Appl. No.: 390,016

[22] Filed: Jun. 21, 1982

[51] Int. Cl.³ ............................................... F04B 21/00
[52] U.S. Cl. ..................................... 417/572; 384/398
[58] Field of Search ....................... 417/44, 45, 53, 17, 417/13, 424, 32, 12, 299, 572; 62/153; 384/398; 310/90

[56] References Cited

U.S. PATENT DOCUMENTS

| | | | |
|---|---|---|---|
| 2,062,052 | 11/1936 | Horlacher | 417/17 X |
| 2,719,065 | 9/1955 | Hornbostel . | |
| 2,999,725 | 9/1961 | Schaefer . | |
| 3,147,821 | 9/1964 | Eggenberger . | |
| 3,196,629 | 7/1965 | Wood | 62/183 |
| 3,584,980 | 6/1971 | Cawley . | |
| 4,207,031 | 6/1980 | Maskrey et al. | 417/12 |
| 4,243,079 | 1/1981 | Daniels . | |
| 4,352,635 | 10/1982 | Saunders | 417/12 X |
| 4,401,419 | 8/1983 | Rabe | 417/415 |

Primary Examiner—Edward K. Look
Attorney, Agent, or Firm—Robert H. Kelly

[57] ABSTRACT

Apparatus and a method are disclosed for providing a lubricant film within a sleeve bearing for prolonging bearing life. A rotating shaft is supported by a sleeve bearing and power is supplied to the rotating shaft. That the shaft is operated at a minimum speed to establish a lubricant film between the shaft and the bearing upon startup prior to being operated at a reduced rotational speed. Once the lubricant film is established, this film is maintained during reduced speed operation and bearing life is prolonged.

6 Claims, 2 Drawing Figures

METHOD AND APPARATUS FOR PROLONGING SLEEVE BEARING LIFE IN A MULTIPLE SPEED ROTATIONAL DEVICE

BACKGROUND OF THE INVENTION

1. Field of the Invention

The present invention relates to securing a rotating shaft in a sleeve bearing. More specifically, the present invention relates to a rotating device capable of being operated at multiple speeds and including means for assuring a lubricant film between the sleeve bearing and the shaft for prolonging sleeve bearing life.

2. Description of the Prior Art

In an air conditioning system it is desirable to have the capability of operating the air conditioning system to cool an enclosure notwithstanding the outdoor ambient temperature is relatively low. In a typical refrigeration circuit the condensing temperature and pressure and consequently the evaporator temperature are a function of the ambient air temperature. In order to allow air conditioning systems to operate effectively in low outdoor conditions it is necessary that the condensing temperature, the temperature at which refrigerant changes state from a gas to a liquid within the condenser, be maintained at a minimum temperature level. On hot days condenser fans are utilized to circulate ambient air in heat exchange relation with refrigerant in the condenser to effect a transfer of heat energy from the refrigerant to the air such that the refrigerant changes state from a gas to a liquid. When the ambient air temperature is reduced, a smaller volume of air or none at all needs to be forcibly circulated over the condenser surface to provide for appropriate heat transfer. If the condenser fans are operated at full speed and the ambient temperature is sufficiently low then the refrigerant is condensed at a lower temperature and thereafter subcooled to an even lower temperature such that freezeup may occur on the evaporator heat transfer surfaces. Overall system capacity may also be reduced since the condensing pressure is reduced and as a result thereof the mass flow rate of refrigerant through the system is also reduced.

To maintain the air conditioning system at full capacity with low outdoor ambient temperature conditions it is desirable to vary the speed of the condensing fan motors to vary the air flow in heat transfer relationship with the condenser. The fan speeds are varied to maintain the condensing temperature at a desired level. Typically, a refrigerant temperature is sensed someplace in the closed refrigeration circuit to determine at what flow rate to circulate air, if any, over the condensing surface.

Speed control devices have been utilized to vary the speed of the electric motor connected to drive a propeller type fan for circulating the ambient air over the condenser. It has been found that an economical and efficient system for accomplishing such a fan speed variance is to utilize a tapped transformer for supplying power at various voltages to the motor. This tapped transformer allows the use of a standard motor to achieve the various operating speeds.

Another system for utilizing a conventional economical fan motor is to utilize a motor having a sleeve bearing as opposed to a more expensive ball bearing. The sleeve bearing motor has a rotating shaft which is secured within a cylindrical sleeve. Lubricant is supplied to the space between the sleeve and the shaft for supporting the shaft on a lubricant film between the bearing and shaft.

It has been found that if the fan motor is operated at a sufficiently slow speed that the lubricant film is not established between the shaft and the bearing. If no lubricant film is established the bearing life is greatly reduced. It has further been found that if, upon startup, the shaft is operated at a minimum rotational velocity to establish a lubricant film then subsequent slower speed operation does not destroy the lubricant film. Hence, operation of the fan motor at the reduced speed after the film has been established maintains the film and acts to prolong the bearing life.

As described herein, there will be disclosed a control system which, upon startup, acts to energize the fan motor at a minimum speed which may vary from 500 to 800 revolutions per minute for a predetermined time interval to establish a lubricant film. Thereafter, depending upon the need for ambient air to be circulated over the condenser, the fan speed may be lowered while the lubricant film is maintained.

SUMMARY OF THE INVENTION

An object of the present invention is to provide a control system for a fan motor.

A further object of the present invention is to provide apparatus and a method for establishing a lubricant film in a sleeve bearing rotating shaft device.

A further object of the present invention is to provide a control system wherein a fan motor is operated at a predetermined minimum speed to establish a lubricant film and thereafter operated at a reduced speed if required by the appropriate sensed conditions.

It is a further object of the present invention to provide a safe, economical and reliable control system for operating a fan motor associated with an air conditioning system.

These and other objects are achieved according to the invention by the provision of a control arrangement for an electric motor having a lubricated sleeve bearing supporting the motor shaft. Said motor has a plurality of operating speeds and includes motor speed control means electrically connected to the motor and a sensor means for generating a response indicative of the motor speed desired. Circuit means are provided and connected to both the sensor means and the motor speed control means for energizing the motor at the speed indicated by the sensor means. A startup speed control means for energizing the motor at a predetermined minimum rotational speed for a selected time interval approximately between two and four seconds to establish a lubricant film within the bearing prior to operating the motor at reduced rotational speed is also included.

A tapped transformer having a series of relays for connecting the motor to the appropriate tap of the transformer is provided. A control circuit, based upon the resistance generated via the thermistor, is utilized to energize the appropriate relays for selecting the appropriate fan speed. A resistance capacitance timing circuit is connected via an integrated circuit to energize the motor driving the fan at an appropriate speed to establish a lubricant film upon startup.

DESCRIPTION OF THE PREFERRED EMBODIMENT

The preferred embodiment as described herein will refer to a condensing fan motor for use with a refrigeration circuit. It is to be understood that the control arrangement and the method of operation wherein a lubricant film is established prior to operating at reduced speed may be utilized in other applications and with devices other than electric motors.

Figure 1:
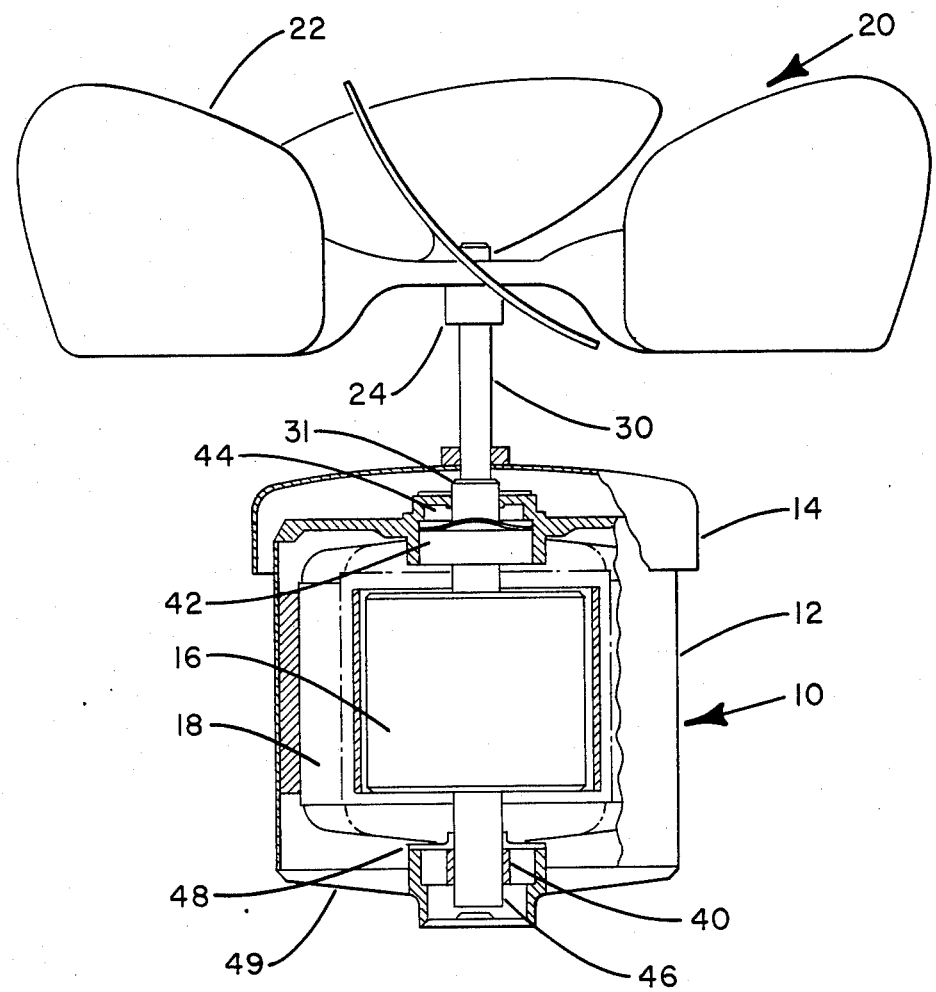
FIG. 1 is a sectional view of a sleeve bearing type fan motor and fan.

Referring now to FIG. 1 there can be seen a schematic of a vertically mounted fan motor 10. This motor includes a rotor 16, stator 18 and casing 12. Fan 20 has hub 24 and fan blades 22 mounted to shaft 30 of the motor. Rain shield 14 is provided for protecting the motor from vertically falling rain. Stepped shaft 31, preload spring 40, grease reservoir 44 and sleeve bearing 42 are all shown mounted at the upper part of the motor. At the lower part of the motor shown in a partially cutaway section may be seen grease reservoir 46, sleeve bearing 40, the end bell of the motor 49 and lower bearing water slinger 48. It can be seen therein that bearing 40 has shaft 30 of the motor extending therethrough. Lubricant is maintained in the reservoir 46. It is this lubricant that flows in the space between the shaft and the bearing to establish the lubricant film. This bearing may have openings through it such that the lubricant may flow through the openings into the space between the rotating shaft and the bearing. The bearing may also have a diagonal groove or similar indentation for promoting oil flow within the bearing. Additionally, the reservoir may be filled with a wick type material or other material for securing the lubricant therein.

Figure 2:
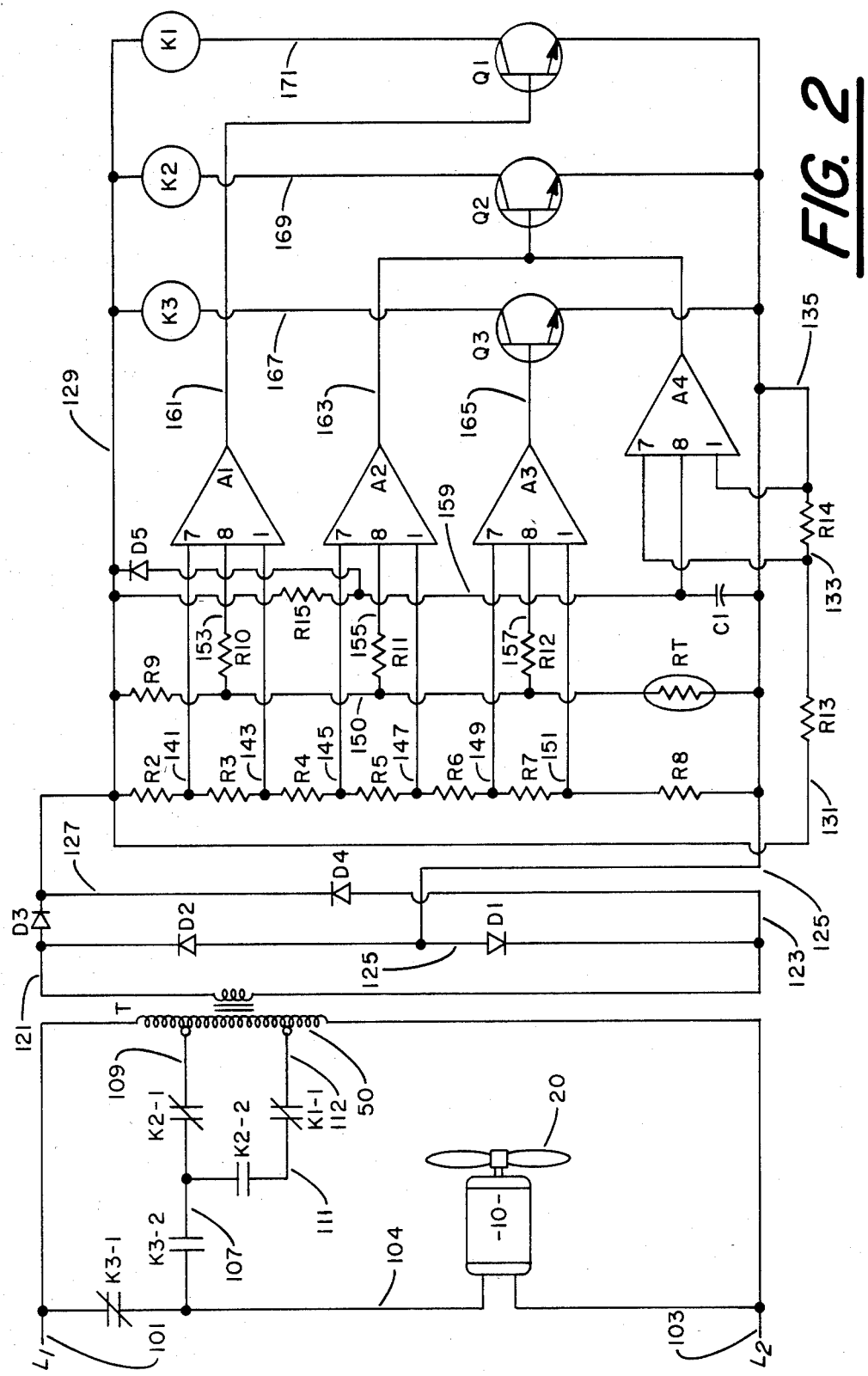
FIG. 2 is a wiring schematic of a control system for controlling operation of the fan motor.

FIG. 2 discloses a wiring schematic for a control system for operating a motor at various speeds. It can be seen that power is supplied through lines L-1 and L-2. Wire 103 is connected to L-2 and fan motor 10 as well as transformer 50. Line L-1 is connected by wire 101 to normally closed relay contacts K3-1 and to transformer 50. Wire 104 connects normally closed relay contacts K3-1 with normally open relay contacts K3-2 and fan motor 10. Fan motor 10 is physically connected to fan 20. Wire 107 connects normally open relay contacts K3-2 with normally open relay contacts K2-2 and normally closed relay contacts K2-1. Wire 109 connects normally closed relay contacts K2-1 with a tap connection to transformer 50. Wire 111 connects normally open relay contacts K2-2 and normally closed relay contacts K1-1. Wire 112 Connects normally closed relay contacts K1-1 with a tap connection to transformer 50.

The low voltage side of the transformer 50 is connected to the control circuit portion of the wiring schematic shown in FIG. 2 as opposed to the power portion already described. Wire 121 is connected from transformer 50 to diodes D-3 and D-2. Wire 123 is connected from transformer 50 to diodes D-1 and D-4. Wire 125 connects diodes D-1 and D-2, resistor R-8, thermistor RT, capacitor C-1 and switching transistors Q-1, Q-2 and Q-3. Wire 127 connects diodes D-4 and D-3 to wire 129. The four diodes, D-1 through D-4, compose a diode bridge for supplying direct current to the remainder of the control circuit.

Resistor R-2 is connected to resistor R-3 which is connected to resistor R-4 and so on in series through resistor R-8. Resistor R-2 is also connected via wire 131 to resistor R-13 and via wire 129 to resistor R-9, resistor R-15, to diode D-5 and to relays K-1, K-2 and K-3. Resistor R-2 is connected via wire 141 to resistor R-3 and to terminal seven of integrated circuit A-1. Resistor R-3 is connected via wire 143 to resistor R-4 and to terminal one of integrated circuit A-1. Resistor R-4 is connected via wire 145 to resistor R-5 and to terminal seven of integrated circuit A-2. Resistor R-5 is connected via wire 147 to resistor R-6 and to terminal one of integrated circuit A-2. Resistor R-6 is connected via wire 149 to resistor R-7 and to terminal seven of integrated circuit A-3. Resistor R-7 is connected to resistor R-8 via wire 151 and to terminal one of integrated circuit A-3.

Resistor R-9 is connected via wire 150 to resistor R-10, R-11 and R-12 which are connected respectively by wires 153, 155 and 157 to terminal eight of integrated circuits A-1, A-2 and A-3 respectively. Wire 150 also connects resistor R-9 to thermistor RT. Resistor R-15 is connected to wire 129 and connected by wire 159 to terminal eight of integrated circuit A-4 and to capacitor C-1. Resistor R-13 is connected to resistor R-14 and to terminal seven of integrated circuit A-4 via wire 133. Wire 135 connects resistor R-14 to wire 125 and to terminal one of integrated circuit A-4.

Integrated circuit A-1 is connected via wire 161 to the base of switching transistor Q-1. Integrated circuit A-2 and A-4 are connected via wire 163 to the base of switching transistor Q-2. Integrated circuit A-3 is connected via wire 165 to the base of switching transistor Q-3. Wire 167 connects switching transistor Q-3 with relay K-3; wire 169 connects switching transistor Q-2 with relay K-2; and wire 171 connects switching transistor Q-1 with relay K-1.

Appropriate pullup resistors and circuit protective devices need be provided with the integrated circuits. These elements have been omitted from the drawing for clarity purposes.

Operation

Thermistor RT is mounted in heat transfer relation to a portion of the refrigeration circuit and is responsive to the temperature thereof. Based upon that temperature, a selected resistance is generated by the thermistor. Based upon the combination of this resistance and the other resistances of resistors R-2 through R-12, appropriate voltage levels are established. Resistors R-2 through R-8 and R-13 and R-14 establish reference level voltages for integrated circuits A-1 through A-4. Resistor R-9, and the resistance of the thermistor act to generate appropriate voltage drops depending upon the level of resistance generated by the thermistor. Integrated circuits A-1 through A-4 are all RCA circuits 3098 acting as programmable Schmidt triggers which have an output which goes high when the voltage level at pin 8 exceeds the voltage level at pin 7 and which output goes low when the voltage level at pin 8 falls below the voltage level at pin 1. Hence, if the resistance of the thermistor is such that a voltage level is detected outside the range of the voltage levels between terminals one and seven integrated circuit A-2, integrated circuit A-2 acts to sink power together with circuit components not shown through wire 163 to switching transistor Q-2 to de-energize relay K-2.

Relays K-1, K-2 and K-3 are normally open and the relay contacts as shown are those shown with the relays not energized. Upon the application of power to the circuit all the relays are initially energized switching from the positions shown.

Hence, depending upon the voltage sensed at the various terminal eights of integrated circuits A-1, A-2 and A-3, the appropriate switching transistors are de-energized. Hence, upon startup of the unit, if the voltage drop is such that it does fall within the hysteresis range of any of the three integrated circuits all three relays are energized and are in the opposite position than the position shown in FIG. 2 such that fan motor 10 receives no power. Should the voltage change such that the voltage at terminal 8 of integrated circuit A-3 is outside the hysteresis range of that integrated circuit then wire 165 is energized and switching transistor Q-3 is de-energized thereby de-energizing relay K-3. In this condition, the K3-1 contacts are closed and K3-2 contacts are opened such that power is supplied from wire 101, through now closed relay contacts K3-1 and through wire 104 to fan motor 10. In this condition, the fan motor is operated at full speed based upon the voltage between lines L-1 and L-2.

Should the voltage level change and be detected outside the hysteresis range of integrated circuit A-2 then the Q-2 switching transistor is de-energized, de-energizing relay K-2, switching the K-2 relay contacts. The K2-1 contacts are now closed and the K2-2 contacts are now open. Hence, the circuit is connected via wire 109 from transformer 50 through now closed relay contacts K2-1, through wire 107 through now closed relay contacts K3-2 through wire 104 to operate the fan motor. In this condition, the fan motor is operated with power having a voltage level of the tap of transformer 50 connected to wire 109.

Should terminal eight of integrated circuit A-1 detect a voltage outside the hysteresis range of that integrated circuit then the K-1 relay will likewise be de-energized and the K1-1 contacts closed. Power is then supplied to the fan motor through wire 112, through the normally closed K1-1 contacts, wire 111, now closed K2-2 contacts, wire 107, now closed K3-2 contacts and wire 104 to operate the motor at a speed represented by the voltage level of the power source as connected via wire 112 to a tap of transformer 50.

In order to establish an initial minimum speed of the fan motor to establish the lubricant oil film, a startup arrangement is provided. Integrated circuit A-4 is connected such that a voltage drop outside the hysteresis range between terminals one and seven is detected upon startup. A resistance capacitance timing circuit, including resistor R-12 and capacitor C-1, acts to generate a voltage drop outside the hysteresis range for approximately three seconds upon startup. For this three second interval, switching transformer Q-2 is de-energized and the K2-1 contacts are closed thereby operating the fan motor at the middle speed since the K3-2 contacts are now closed. If the Q-3 transistor is otherwise energized the fan motor will operate at full speed.

Hence, it may be seen that a control circuit is provided for maintaining the fan motor at a selected minimum speed for a time interval to establish a lubricant film. Thereafter, the system is operated at a fan speed as determined by the conditions of the refrigeration circuit.

The invention has been described with reference to a particular embodiment but it is to be understood by those skilled in the art that modifications and variations can be effected within the spirit and scope of this invention.

What is claimed is:

1. A method of prolonging sleeve bearing life in a machine having a plurality of operating speeds and at least one lubricated sleeve bearing securing a rotating shaft which comprises the steps of:
    selecting the appropriate rotational operating speed for the machine;
    energizing the machine to operate at the appropriate rotational speed;
    overriding the steps of selecting and energizing to operate the machine at a rotational velocity generally between 500 and 800 RPM for between two and four seconds to establish a lubricant film between the sleeve bearing and the rotating shaft; and
    discontinuing the step of overriding after the elapse of at least the time period to establish the lubricant film, to permit the machine to operate at a rotational velocity less than that necessary to establish a lubricant film between the sleeve bearing and the rotating shaft.

2. The method as set forth in claim 1 wherein the step of overriding is bypassed if the step of selecting acts to cause the machine to be operated at a rotational velocity, generally greater than 500 RPM, the rotational velocity necessary to establish the lubricant film.

3. A control arrangement for an electric motor having a lubricated sleeve bearing supporting the rotor shaft, said motor having a plurality of operating speeds, which comprises:
    motor speed control means electrically connected to the motor wherein the motor is powering a fan for circulating air in heat exchange relationship with a refrigeration circuit;
    sensor means for generating a response indicative of the motor speed desired wherein the sensor means comprises a thermistor mounted to the refrigeration circuit and connected to vary in resistance in response to a measured temperature;
    circuit means connected to the sensor means and the motor speed control means for energizing the motor at the speed indicated by the sensor means wherein the circuit means comprises integrated circuits connected to detect voltage drops outside a predetermined range and to appropriately de-energize relays in response thereto; and
    startup speed control means for energizing the motor at generally between 500 and 800 RPM, a predetermined minimum rotational speed for a time interval generally between two and four seconds to establish a lubricant film within the sleeve bearing prior to operating the motor at a reduced rotational speed less than generally 500 RPM.

4. The apparatus as set forth in claim 3 wherein the motor speed control means includes a tapped transformer connected through relay means to supply power at various voltage levels to the electric motor for operating the motor at selected speeds.

5. The apparatus as set forth in claim 3 wherein the startup speed control comprises an integrated circuit connected to enable a circuit to operate the motor at said predetermined minimum rotational velocity.

6. The apparatus as set forth in claim 3 wherein the startup speed control means further comprises a resistance-capacitance timing circuit for supplying a signal to the integrated circuit for a predetermined startup time interval.

* * * * *